Figure 1:
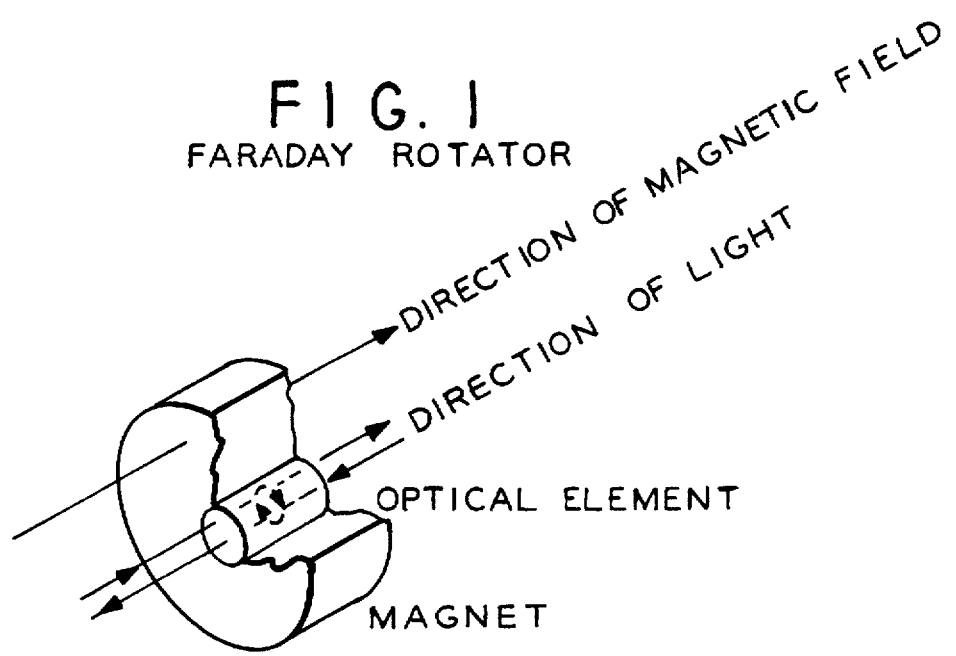

United States Patent [19]

Wilson et al.

[11] Patent Number: 5,790,299
[45] Date of Patent: Aug. 4, 1998

[54] OPTICAL ISOLATOR EMPLOYING A CADMIUM-ZINC-TELLURIUM COMPOSITION

[75] Inventors: Donald K. Wilson, West Caldwell; Mark Percevault, West Milford, both of N.J.

[73] Assignee: Optics For Research, Caldwell, N.J.

[21] Appl. No.: 573,401

[22] Filed: Dec. 15, 1995

[51] Int. Cl.$^6$ .................... G02B 5/30; G02F 1/09
[52] U.S. Cl. .............. 359/281; 359/283; 359/484; 359/501
[58] Field of Search ................ 359/280, 281, 359/282, 283, 484, 501

[56] References Cited

U.S. PATENT DOCUMENTS

| | | |
|---|---|---|
| 4,033,670 | 7/1977 | Tanton et al. . |
| 4,280,107 | 7/1981 | Scifres et al. . |
| 4,604,577 | 8/1986 | Matsumura et al. . |
| 4,804,256 | 2/1989 | Wilson .................. 359/484 |
| 4,840,464 | 6/1989 | Wilson . |
| 5,087,984 | 2/1992 | Heiney et al. .......... 359/282 |
| 5,596,447 | 1/1997 | Onodera ................ 359/484 |

FOREIGN PATENT DOCUMENTS

| | | | |
|---|---|---|---|
| 0470523 | 2/1992 | European Pat. Off. ........ 359/484 |
| 0218623 | 11/1985 | Japan .................... 359/484 |
| 0123814 | 6/1986 | Japan .................... 359/281 |
| 1-127984 | 5/1989 | Japan . |
| 4242222 | 8/1992 | Japan .................... 372/703 |
| 4247423 | 9/1992 | Japan .................... 359/484 |
| 2173607 | 10/1986 | United Kingdom .......... 359/484 |

OTHER PUBLICATIONS

Kampel; "A Yig Radiometer and Temperature Controller"; Wireless World; Oct. 1970; pp. 501–504.

Turner et al; "New Class of Materials for Optical Isolators"; Applied Optics; vol. 22, No. 20, 15 Oct. 1983.

Butler, et al., *Appl. Phys. Lett.*, vol. 49, No. 17, pp. 1053–1055 (Oct. 27, 1986).

Becla, *J. Vac. Sci. Technol.*, vol. 4A, No. 4, pp. 2014–2018 (Jul.–Aug. 1986).

Becla, *J. Vac. Sci. Technol.*, vol. 6A, No. 4, pp. 2752–2727 (Jul.–Aug. 1988).

Triboulet, et al., *Journal of Crystal Growth*, vol. 101, pp. 131–134 (1990).

Triboulet, et al., *Journal of Crystal Growth*, vol. 101, pp. 216–220 (1990).

Terry, et al., *Physical Review Letters*, vol. 69, No. 12, pp. 1800–1803 (Sep. 21, 1992).

*Primary Examiner*—Ricky D. Shafer
*Attorney, Agent, or Firm*—John N. Bain; Raymond J. Lillie

[57] ABSTRACT

A Faraday rotator for rotating a plane of polarization of polarized light, said Faraday rotator having an optical element comprising a rod which is comprised of an optically transmitting composition comprising cadmium, zinc, and tellurium, and preferably from about 30 wt. % to about 48 wt. % cadmium, from about 2 wt. % to about 20 wt. % zinc, and about 50 wt. % tellurium. This Faraday rotator is especially useful an optical isolator for preventing feedback of transmitted light waves.

3 Claims, 1 Drawing Sheet

FARADAY ROTATOR

OPTICAL ISOLATOR

OPTICAL ISOLATOR EMPLOYING A CADMIUM-ZINC-TELLURIUM COMPOSITION

This application relates to optical isolators and Faraday rotators which rotate the plane of polarization of polarized light. More particularly, this application relates to optical isolators and Faraday rotators which include an optical element being made of a composition comprising cadmium, zinc, and tellurium.

Optical isolators are devices which are used for operation with certain lasers or other light sources in the ultraviolet, visible, and infrared spectrums. An optical isolator permits the transmission of light in one direction while blocking the reverse transmission of that light. An optical isolator is especially useful when used in conjunction with a laser in that it prevents optical feedback into the laser. This feedback is analogous to electronic feedback.

The optical isolator works by rotating the plane of polarization of polarized light as the polarized light passes through the medium known as an optical element. The optical element is contained within a means for generating a magnetic field along the optical axis of rotation of said optical element. The optical element is made of a material having a Verdet constant. The Verdet constant is a measure of the ability of a material to rotate the plane of polarization of polarized light. The optical element and the means for generating a magnetic field along the optical axis of rotation of the optical element is known as a Faraday Rotator. An example of the means for generating the magnetic field for the Faraday rotator is a "donut-shaped" magnet, i.e., a magnet having the configuration of an annulus, and which has a hole for containing the optical element.

An optical isolator is comprised of an input polarizer, followed by the Faraday rotator, followed by an output polarizer. These three elements are all contained in a body.

Light emitted from a source enters an input polarizer. The input polarizer causes light entering from one direction to be linearly polarized. In this way, a plane of polarization of polarized light is formed. The polarized light then enters the optical element of the Faraday rotator, the optical element being surrounded by a means for generating a magnetic field such as a permanent magnet or an electromagnet. The generation of a magnetic field along the optical axis of traveling light contained in the optical element rotates the plane of polarization of polarized light by a desired angle of rotation θ. The rotation of the plane of polarization may be clockwise or counterclockwise. Light exiting the Faraday rotator, its plane of polarization having been rotated, enters an output polarizer. The plane of polarization in the output polarizer is parallel to the plane of polarization of the polarized light exiting the Faraday rotator. The light then exits the output polarizer and enters into a system and/or carries out its intended use. A series of reflections of the light may occur, and some of the light may be reflected back to the original source. The reflected light, now traveling in the reverse direction, re-enters the output polarizer. This light, being of random polarization, again becomes polarized in a plane of polarization that is at an angle of rotation θ. The light then exits the output polarizer, and re-enters the Faraday rotator, wherein the plane of polarization of the re-polarized light is again rotated by the desired angle of rotation, thus resulting in a total angle of rotation 2θ. This again-rotated polarized light exits the Faraday rotator and re-enters the input polarizer in the reverse direction. If the total angle of rotation 2θ equal 90°, extinction, or maximum isolation of the light which is traveling in the reverse direction, occurs. In this way, optical feedback is therefore prevented.

The optical element may be formed from a variety of materials which are capable of transmitting light and of providing for the rotation of the plane of polarization of polarized light by a desired angle of rotation upon generation of a magnetic field along the optical axis of the optical element. For example, U.S. Pat. No. 4,840,464, issued to Wilson, discloses an optical element comprising a rod which is comprised of an optically transmitting composition comprising from about 15 wt. % to about 50 wt. % germanium, from about 5 wt. % to about 20 wt. % arsenic, and from about 30 wt. % to about 80 wt. % selenium.

Applicant has provided a Faraday rotator which has an improved ability to rotate the plane of polarization of polarized light. Applicant's invention, in one aspect, is a Faraday rotator which comprises an optical element in which is rotated a plane of polarization of polarized light along an optical axis. The optical element comprises a rod which comprises an optically transmitting composition comprising a dilute magnetic semiconductor or semimagnetic semiconductor material. In particular, the composition comprises cadmium, zinc, and tellurium, or cadmium-zinc-telluride or CdZnTe. The terms "cadmium-zinc-telluride" and "CdZnTe" as used herein mean any composition including cadmium, zinc, and tellurium which has Faraday rotation activity. Preferably, the composition comprises from about 30 wt. % to about 48 wt. % cadmium, from about 2 wt. % to about 20 wt. % zinc, and about 50 wt. % tellurium. More preferably, the composition comprises from about 40 wt. % to about 48 wt. % cadmium, from about 2 wt. % to about 10 wt. % zinc, and about 50 wt. % tellurium. The Faraday rotator also comprises a means for generating a magnetic field along the optical axis of said optical element, thereby rotating the plane of polarization of polarized light about the optical axis of the optical element. The means for generating a magnetic field may be a permanent magnet or an electromagnet. The magnet may be of any shape. In one embodiment, the magnet is in the shape of an annulus, or "donut" having a hole in which the optical element is contained. The optical element may be contained within a tube made of a non-magnetic material such as brass, said tube being disposed between the optical element and the magnet.

In accordance with another aspect of the present invention, there is provided an optical isolator having an input polarizer for polarizing beams or waves of light, a Faraday rotator of the embodiment mentioned above, and an output polarizer. Applicant's invention is also directed to a method of rotating the plane of polarization of polarized light using the optical isolator or Faraday rotator described above.

Figure 2:
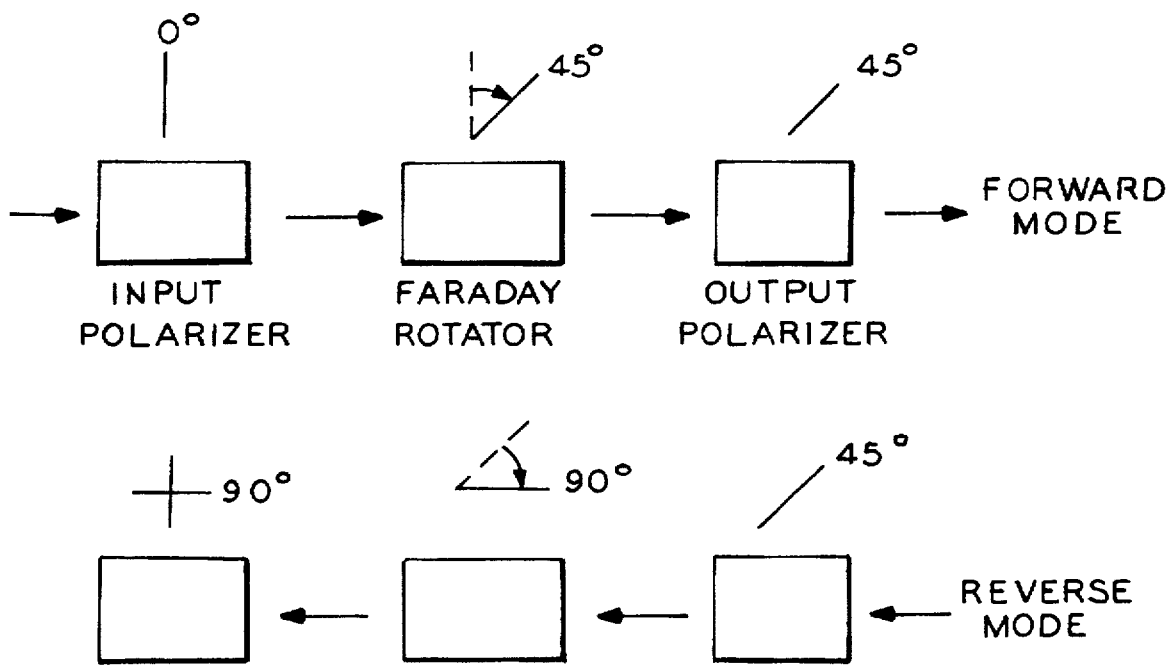

The invention now will be described with respect to the drawings wherein:

FIG. 1 is a break-away diagram of an embodiment of a Faraday rotator in accordance with the present invention; and FIG. 2 is a block diagram of the operation of an optical isolator in accordance with an embodiment of the present invention.

Referring now to the drawings, a Faraday rotator in accordance with one embodiment of the present invention comprises an optical element and a magnet. In the embodiment shown, the optical element is in the form of a rod. The rod can be surrounded by a non-magnetic material such as brass. The magnet, in the embodiment shown, is in the form of an annulus, or "donut" which completely surrounds the optical element, but magnets of other shapes may be used as long as a magnetic field can be generated along the optical axis, along which polarized light travels within the optical element. The magnet may be a permanent magnet or an electromagnet.

The optical element comprises a rod which is comprised of an optically transmitting composition comprising a dilute magnetic semiconductor or semimagnetic semiconductor material. In particular, the composition is cadmium-zinc-telluride as hereinabove described. Preferably, the composition comprises from about 30 wt. % to about 48 wt. % cadmium, from about 2 wt. % to about 20 wt. % zinc, and about 50 wt. % tellurium. More preferably, the composition comprises from about 40 wt. % to about 48 wt. % cadmium, from about 2 wt. % to about 10 wt. % zinc, and about 50 wt. % tellurium. This type of optical element has improved ability to rotate the plane of polarization of polarized light. This material, therefore, is in what is known as the class of diamagnetic materials. Representative examples of cadmium-zinc-telluride compositions which may be employed in the optical element hereinabove described include those sold by Keystone Crystal Corp. of Butler, Pa. and by Two-Six Corp. of Saxonburg, Pa.

In FIG. 1 are shown the directions of light waves or beams which travel through the optical element. Polarized light travels in one direction from the light source along an optical axis, and reflected polarized light travels in a direction opposite that of the polarized light traveling from the light source, along an optical axis. The magnetic field generated by the annular or donut-shaped magnet is in a direction toward or away from the light source. The magnetic field generated by the magnet along the optical axis enables the plane of polarization of polarized light to be rotated by a desired angle of rotation θ. This rotation may be clockwise or counterclockwise.

Referring now to FIG. 2, it will now be seen how an embodiment of an optical isolator in accordance with an embodiment of the present invention serves to prevent feedback of light waves.

Light from a source, such as, for example, a laser or an optical fiber, traveling in the forward mode, enters an input polarizer which polarizes the light by causing the light to be linearly polarized, thus creating a plane of polarization of polarized light. The polarized light exits the input polarizer and enters the Faraday rotator.

The polarized light enters the optically transmitting optical element comprised of the composition of cadmium, zinc, and tellurium as described above, of the Faraday rotator along an optical axis. The optical element, by virtue of the generation by a magnet of a magnetic field along the optical axis, rotates the plane of polarization of polarized light by a desired angle of rotation θ. This rotation may be clockwise or counterclockwise. In the embodiment depicted in FIG. 2, the angle of rotation θ is 45°. The polarized light, thus having had its plane of polarization rotated by 45°, exits the Faraday rotator and enters the output polarizer or analyzer. The output polarizer has a plane of polarization parallel to that of the polarized light which has exited the Faraday rotator. Light which exits the output polarizer then enters into a system and/or begins its intended use. A series of reflections may occur, and some of the light is transmitted back toward the light source in the reverse mode in random planes of polarization.

In the reverse mode, the reflected polarized light, which was traveling in random planes of polarization, reenters the output polarizer in which a plane of polarization having an angle of rotation of θ, or 45°, is formed for the reflected polarized light. The polarized light then exits the output polarizer and reenters the optical element of the Faraday rotator. The polarized light, which was linearly polarized at an angle of 45° in the output polarizer while traveling the reverse mode, now has its plane of polarization rotated another 45° while traveling in the reverse mode within the optical element, thus making the total angle of rotation of 2θ, or 90°. The polarized light, which has now had its plane of polarization rotated by a total angle of rotation of 90°, exits the Faraday rotator and reenters the input polarizer.

In the input polarizer, the reflected light which has traveled in the reverse mode, with its plane of polarization having been rotated 90°, becomes extinct. Maximum isolation of this light now occurs, thus preventing optical feedback.

In some embodiments the plane of polarization of the polarized light may not be rotated by the optical element in the Faraday rotator to an angle of 45° during each pass of the light through the optical element of the Faraday rotator, said optical element being comprised of the composition comprising cadmium, zinc, and tellurium described above. In these cases, the polarized light traveling in the reverse mode will have a plane of polarization that has not been rotated for a total angle of rotation that is 90°. Because of this, there will be some feedback to the light source but not as much feedback as if there were no optical isolator present next to the light source.

It is to be understood, however, that the scope of the present invention is not to be limited to the specific embodiments described above. The invention may be practiced other than as particularly described and still be within the scope of the accompanying claims.

What is claimed is:

1. An optical isolator comprising:
    an input polarizer for polarizing beams or waves of light;
    a Faraday rotator for rotating a plane of polarization of polarized light, said Faraday rotator comprising:
        an optical element in which a plane of polarization of polarized light is rotated along an optical axis, said optical element comprising a rod comprising an optically transmitting composition comprising 40 wt. % to about 48 wt. % cadmium, about 2 wt. % to about 10 wt. % zinc, and about 50 wt. % tellurium; and means for generating a magnetic field along the optical axis of said optical element, thereby rotating said plane of polarization of polarized light in said optical element; and
    an output polarizer.

2. The optical isolator of claim 1 wherein said means for generating a magnetic field comprises a permanent magnet.

3. The optical isolator of claim 1 wherein said means for generating a magnetic field comprises an electromagnet.

* * * * *